(12) United States Patent
Kuroda

(10) Patent No.: US 7,477,464 B2
(45) Date of Patent: Jan. 13, 2009

(54) MANUFACTURING METHOD OF RECORDING MEDIUM, ELECTRIC/MAGNETIC FIELD COPY MASTER AND ELECTRIC/MAGNETIC FIELD COPYING DEVICE

(75) Inventor: Sumio Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 11/507,243

(22) Filed: Aug. 21, 2006

(65) Prior Publication Data

US 2007/0247734 A1    Oct. 25, 2007

(30) Foreign Application Priority Data

Apr. 21, 2006    (JP)    ............................. 2006-118558

(51) Int. Cl.
  *G11B 5/86*    (2006.01)
(52) U.S. Cl. .......................................... 360/17; 360/75
(58) Field of Classification Search ....................... None
  See application file for complete search history.

(56) References Cited

U.S. PATENT DOCUMENTS

| 6,347,016 | B1 | 2/2002 | Ishida et al. |
| 7,218,465 | B1 * | 5/2007 | Deeman et al. ............... 360/16 |
| 2002/0159173 | A1 | 10/2002 | Ishida et al. |
| 2004/0180174 | A1 * | 9/2004 | Niitsuma et al. ........... 428/66.3 |
| 2004/0257687 | A1 | 12/2004 | Ishida et al. |
| 2006/0177699 | A1 * | 8/2006 | Ichikawa et al. ............ 428/826 |

* cited by examiner

*Primary Examiner*—Jason C Olson
(74) *Attorney, Agent, or Firm*—Greer, Burns & Crain, Ltd.

(57) ABSTRACT

When copying servo information from an electro-magnetic field copy master to a vertical storage medium, the magnetization direction of the vertical storage medium is made to the direction the reverse of an external electro-magnetic field applied to the vertical storage medium and the electro-magnetic field copymaster, the vertical storage medium is closely touched on the electromagnetic field copy master provided with a substrate which has concavity/convexity corresponding to the servo information and at least the convex part of which of the concavity/convexity is made of a softly magnetic material and a conductor installed in the concave part of the substrate and an external electro-magnetic field stronger than the coercive field strength of the vertical storage medium is instantaneously applied to the vertical storage medium and the electromagnetic field copy master.

14 Claims, 31 Drawing Sheets

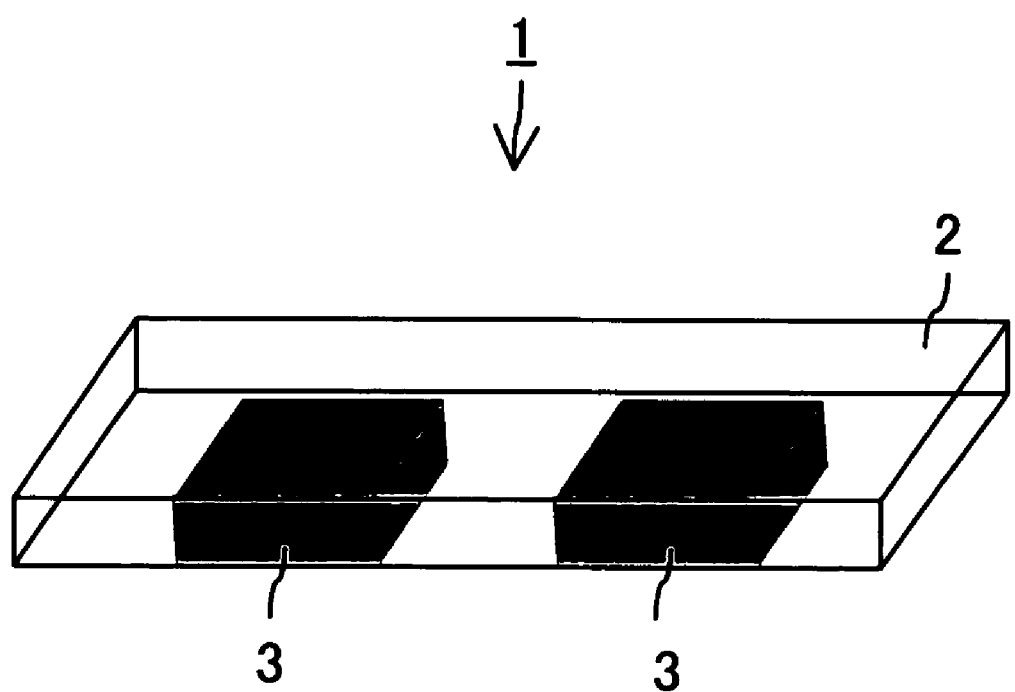
F I G. 7

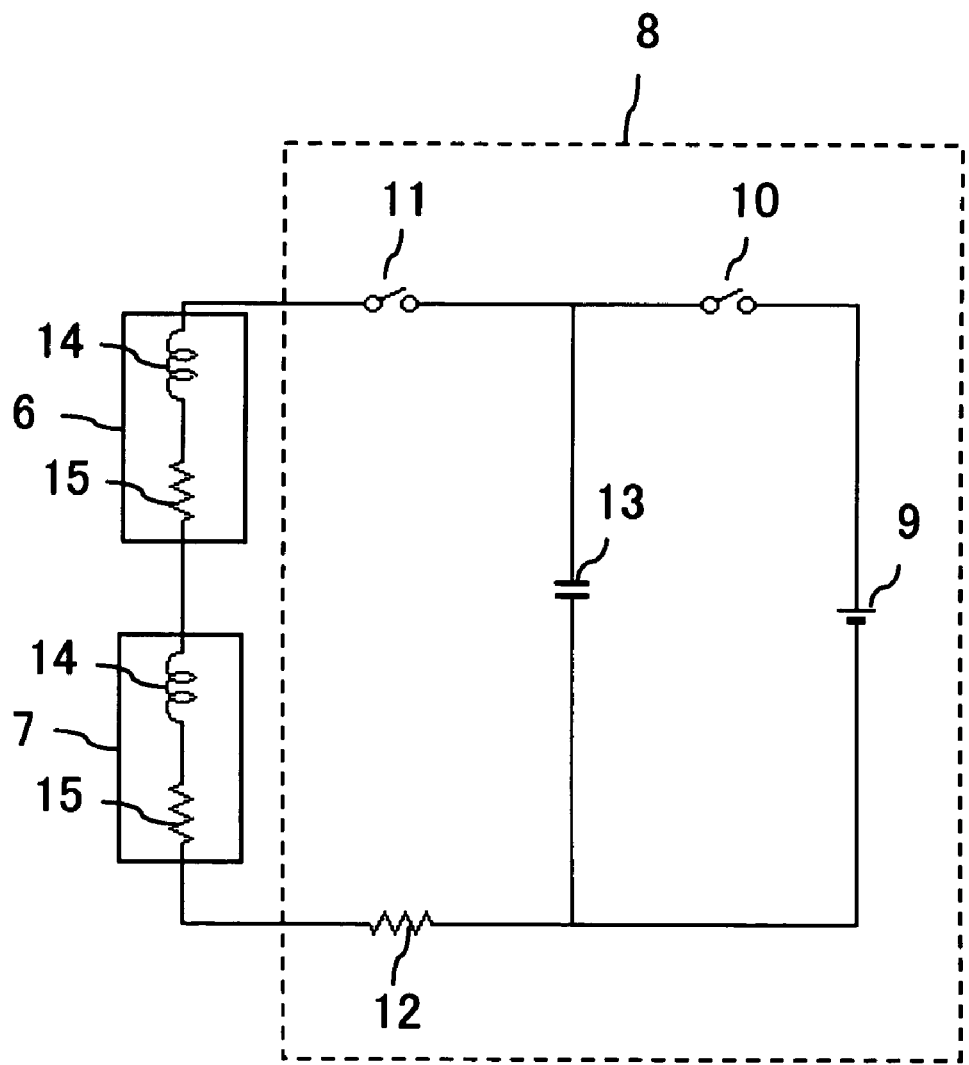
F I G. 1 1

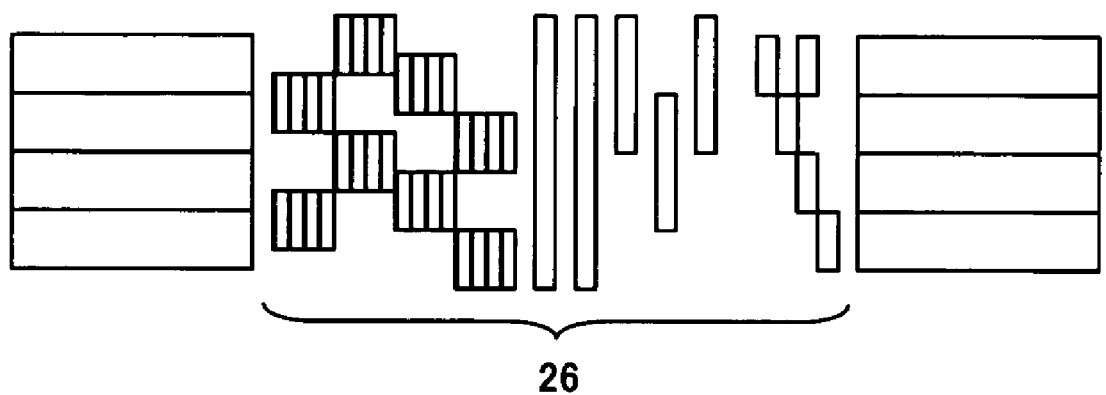
F I G. 18

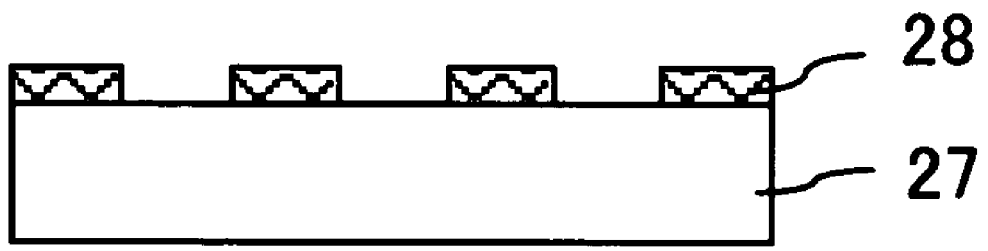
F I G. 19 A

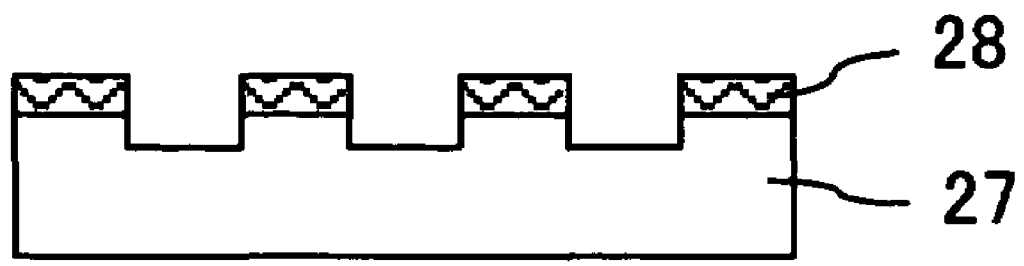
F I G. 1 9 B

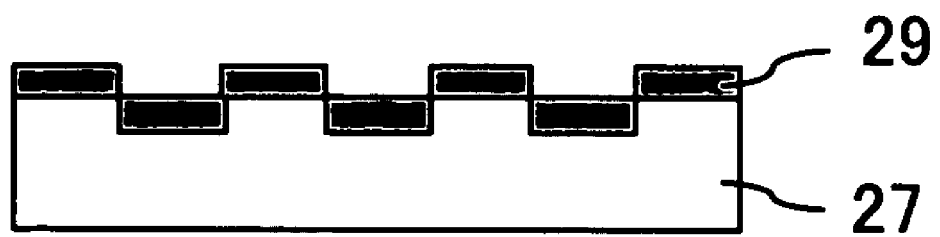
F I G. 1 9 C

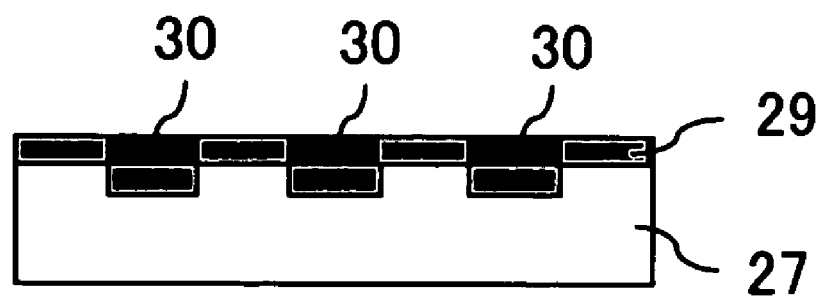
F I G. 1 9 E

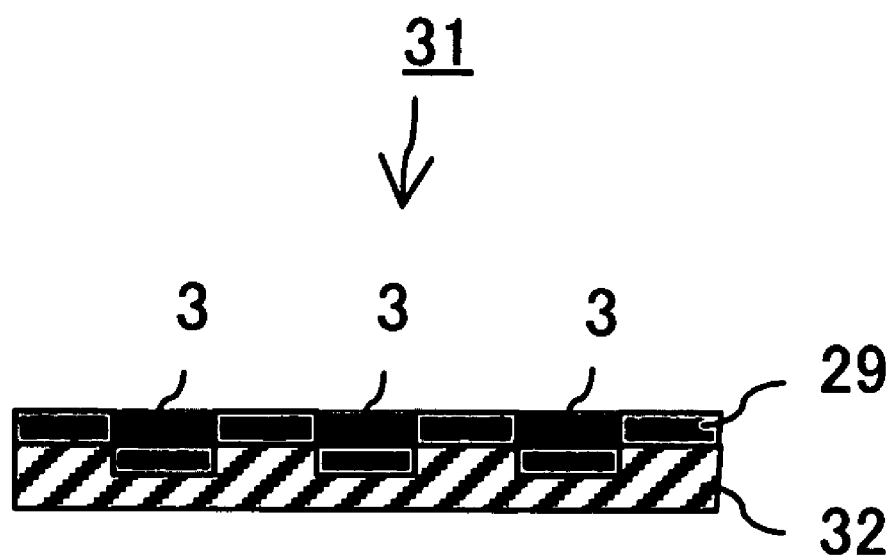
F I G. 2 1

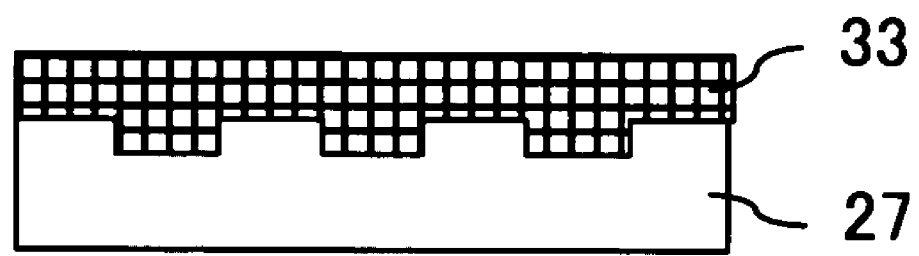
F I G. 2 3 A

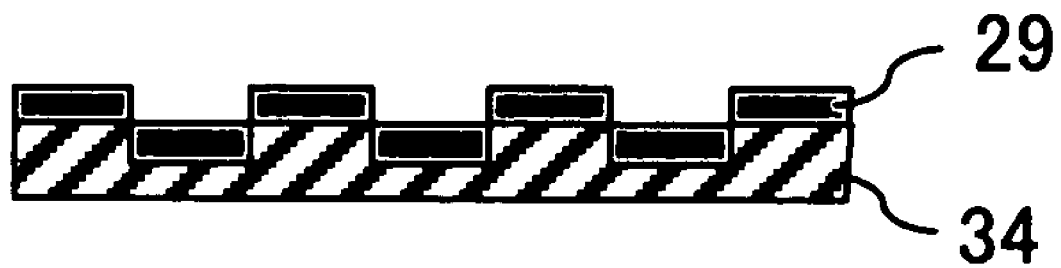
F I G. 2 3 C

MANUFACTURING METHOD OF RECORDING MEDIUM, ELECTRIC/MAGNETIC FIELD COPY MASTER AND ELECTRIC/MAGNETIC FIELD COPYING DEVICE

BACKGROUND OF THE INVENTION

1. Field of the Invention

The present invention relates to the manufacturing method of a storage medium for collectively copying prescribed information from an electro-magnetic field copy master to a perpendicular magnetic record or vertical storage medium.

2. Description of the Related Art

Conventionally, as a method for manufacturing a vertical storage medium by magnetically copying prescribed information to it collectively, for example, a method for magnetically copying prescribed information to a vertical storage medium 183 by closely touching the vertical storage medium 183 on a magnetic copy master 182 provided with a Ni substrate 180 having concavity and convexity on the surface and a soft magnetic material 181 provided on the concavity and convexity of the Ni substrate 180, as shown in FIGS. 1 and 2, and externally applying a magnetic field to the recording surface of the vertical storage medium in the vertical direction is proposed (for example, see Patent reference 1).

In order to obtain good recording performance in such a vertical storage medium manufacturing method, magnetic flux must be collected on the convex part of the soft magnetic material 181 to increase a magnetic field in the neighborhood of the surface of the convex part of the soft magnetic material 181.

However, in the magnetic copy master 182 shown in FIG. 1, since a diamagnetic field is generated in a direction that is the reverse of the magnetic flux inside the soft magnetic material 181, leakage magnetic flux sufficiently large to contribute to the recording of the prescribed information cannot be obtained in the neighborhood of the surface of the soft magnetic material 181 because of this diamagnetic field. In the magnetic copy master 182 shown in FIG. 1, since the soft magnetic material 181 is provided on the concave and convex wall of the Ni substrate 180, as shown in FIG. 2, magnetic flux is easily collected on the edge of the convex part of the Ni substrate 180 to increase the magnetic field on the edge of the convex part of the soft magnetic material 181. Therefore, the reproduction waveform of the vertical storage medium 183 on which the prescribed information is recorded by this magnetic copy master 182 does not form a rectangular wave corresponding to the concavity and convexity of the Ni substrate 180 in the reproduction waveform 184 shown in FIG. 2.

In this case, it can be considered to increase an external magnetic field in order to obtain a magnetic field sufficiently large to contribute to the recording of the prescribed information at least in the neighborhood of the surface of the soft magnetic material 181. However, if an external magnetic field is large, for example, as shown in FIG. 3, the range of magnetic flux expands to the concave part of the Ni substrate 180 and the position of the magnetic wall (boundary where a magnetic field distributed inside the vertical storage medium 183 is inverted) of the vertical storage medium 183 does not coincide with the position of the edge of the concavity and convexity of the Ni substrate 180. Therefore, the reproduction waveform of the vertical storage medium 183 does not form a rectangular wave corresponding to the concavity and convexity of the Ni substrate 180.

If the reproduction waveform of the vertical storage medium 183 does not form a rectangular wave corresponding to the concavity and convexity of the Ni substrate 180 in this way, for example, the decoding of an address recorded in the vertical storage medium 183 and the demodulation accuracy of servo information degrades.

Thus, as the manufacturing method of a vertical storage medium for solving this problem, for example, as shown in FIG. 4, a method for magnetically copy the prescribed information to the vertical storage medium 183 collectively by closely touching the vertical storage medium 183 on a magnetic copy master 187 provided with a substrate 185 with concavity and convexity corresponding to the prescribed information on the surface and a strong magnetic material 186 provided in the concave part of the substrate 185 as shown in FIG. 4 and externally applying a magnetic field (arrow mark) to the recording surface of the vertical storage medium 183 in the horizontal direction issued (for example, see Patent reference 2).

In this manufacturing method of a vertical storage medium, as shown in FIG. 4, magnetic intensity 188 distributed in the vertical storage medium 183 is maximized on the edge of the strong magnetic material 186 and is reduced to almost zero around the center of each strong magnetic material 186 and around the middle of two strong magnetic materials 186. Thus, even when an external magnetic field changes, as shown in FIG. 4, the position in which the reproduction waveform 189 Of the vertical storage medium 183 is maximized can be matched with the position of the edge of the concavity and convexity of the substrate 185. Since in the above-described manufacturing method of a vertical storage medium, an external magnetic field is applied in the horizontal direction, the diamagnetic field generated inside the strong magnetic material 186 does not affect the vertical storage medium 183.

In the recent magnetic disk device provided with a high track-density magnetic disk (for example, hard disk device), servo information for controlling the operation of a magnetic head for reading/writing information from/into a magnetic disk is recorded in the magnetic disk. In this case, the quality of the reproduction waveform of the servo information can be improved by recording this servo information on the magnetic disk by the manufacturing method of a vertical storage medium to which an external magnetic field is applied in the horizontal direction as described above, thereby improving the reliability of the magnetic disk device.

Recently, with the improvement of the track density of a magnetic disk, in order to further improve the reproduction accuracy of the servo information, some magnetic disk device records eccentricity correction information for correcting the error of the servo information after recording the servo information on the magnetic disk. However, since this eccentricity correction information is usually recorded on the magnetic disk by a magnetic head, the reproduction waveform of the magnetic disk on which the eccentricity correction information is recorded forms a rectangular wave as shown in FIG. 5. Therefore, if in order to improve the track density of the magnetic disk while improving the quality of the reproduction waveform of the servo information, the eccentricity correction information is recorded by the magnetic head after recording the servo information on the magnetic disk by the above-described vertical storage medium manufacturing method of applying an external magnetic field in the horizontal direction, two types of read channels; one for reading servo information and the other for reading eccentricity correction information must be handled. If two types of read channels are handled, the configuration of the magnetic disk device becomes complex.

If an external magnetic field is generated using the electro-magnet 190 shown in FIG. 6 in the above-described the vertical storage medium manufacturing method of applying an external magnetic field in the horizontal direction, one of the vertical storage medium 183 and the electro-magnet 190 must be relatively rotated against the other. In this case, it takes much time (tact time) to copy the servo information, compared with the case where an external magnetic field is applied in the vertical direction and the servo information is collectively copied to the vertical storage medium 183. The power supplied to the electro-magnet 190 increases for the longer copy time.

Patent reference 1: Japanese Patent Application Publication No. H10-40544

Patent reference 2: Japanese Patent Application Publication No. 2001-297433

SUMMARY OF THE INVENTION

It is an object of the present invention to provide a storage medium manufacturing method, an electro-magnet copy master and an electro-magnetic field copy device, capable of improving the track density of a vertical storage medium while improving the quality of the reproduction waveform of information recorded the vertical storage medium, and suppressing its copy time and power consumption.

In order to solve the above described problems, the present invention adopts the following method.

Namely, the storage medium manufacturing method of the present invention initializes the magnetization direction of a vertical storage medium in the direction the reverse of the direction of an external electro-magnetic field applied to the vertical storage medium and the electro-magnetic field copy master when copying the prescribed information from the electro-magnetic field copy master to the vertical storage medium, closely touching or approaching the vertical storage medium on or to the electro-magnetic field copy master provided with a substrate which has concavity and convexity corresponding to prescribed information on the surface and at least the convex part of which of the concavity and convexity is made of a soft magnetic material and a conductor provided in the concave part of the substrate and applying an external electro-magnetic field stronger than the coercive field strength of the vertical storage medium to the vertical storage medium and the electro-magnetic field copy master when copying the prescribed information from the electro-magnetic field copy master to the vertical storage medium.

Thus, the magnetization direction of the part of the vertical storage medium in which it closely touches or approaches the soft magnetic material can be inverted by the external electro-magnetic field and be matched with it and the magnetization direction of the part of the vertical storage medium in which it closely touches or approaches the conductor can be maintained in the direction the reverse of the external electro-magnetic field by making a magnetic field generated by induced current flown through the conductor by the external electro-magnetic field which is instantaneously generated and the external electro-magnetic field offset each other. In this case, since magnetic field contrast distributed in the vertical storage medium can be matched with the concavity and convexity of the substrate provided for the electro-magnetic field copy master, the reproduction waveform of the prescribed information copied to the vertical storage medium can be made a rectangular wave.

In the storage medium manufacturing method of the present invention, since the convex part of the substrate of the electro-magnetic field copy master is made of a soft magnetic material, the magnetic flux is not collected on the edge of the convex part of the substrate. Since the magnetization direction of the part of the vertical storage medium in which it closely touches or approaches the soft magnetic material is inverted by the external electro-magnetic field, a diamagnetic field generated inside the soft magnetic material does not affect a magnetic field distributed in the vertical storage medium. Since the external electro-magnetic field applied to the conductor is offset by a magnetic field in the direction the reverse of the external electro-magnetic field generated by induced current flowing through the conductor, the position of the magnetic wall of the vertical storage medium does not deviate from the position of the edge of the convex part of the substrate of the electro-magnetic field copy master. Therefore, the reproduction waveform of the vertical storage medium can be made a rectangular wave corresponding to the concavity and convexity of the substrate provided for the electro-magnetic field copy master. Thus, the quality of the re-production waveform can be improved.

Since the reproduction waveform of the prescribed information recorded on the vertical storage medium can be made a rectangular wave by the storage medium manufacturing method of the present invention, after servo information is recorded on a vertical storage medium by the storage medium manufacturing method of the present invention, eccentricity correction information can be recorded on the vertical storage medium by a magnetic head, improving thereby the track density of the vertical storage medium. Since the type of the read channel of the magnetic head in the case of reading the servo information and eccentricity information can be made one, the configuration of the magnetic disk device provided with the vertical storage medium can be less complex.

Since the storage medium manufacturing method of the present invention applies an external electro-magnetic field in the vertical direction, the prescribed information can be collectively copied from the electro-magnetic field copy master to the vertical storage medium, thereby suppressing the copy time and power consumption.

Since in the storage medium manufacturing method of the present invention, even when the intensity of the external electro-magnetic field changes, the position of the magnetic wall of the vertical storage medium does not deviate from the position of the edge of the convex part of the electro-magnetic field copy master, the intensity of the external electro-magnetic field can have a margin.

The scope of the present invention covers the electro-magnetic field copy master and the electro-magnetic copying device.

According to the present invention, the track density of a vertical storage medium can be improved while improving the quality of the reproduction waveform of information recorded on the vertical storage medium and also the copy time and the power consumption can be suppressed.

BRIEF DESCRIPTION OF THE DRAWINGS

FIG. 7 shows the electro-magnetic field copy master in the preferred embodiment of the present invention;

FIG. 11 shows one example of the circuit configuration of the electro-magnetic field generation unit of the electro-magnetic copying device;

FIG. 18 shows another example of the pattern of servo information;

FIG. 19A shows how to manufacture the electro-magnetic field copy master in the preferred embodiment of the present invention (No. 1);

FIG. 19B shows how to manufacture the electro-magnetic field copy master in the preferred embodiment of the present invention (No. 2);

FIG. 19C shows how to manufacture the electro-magnetic field copy master in the preferred embodiment of the present invention (No. 3);

FIG. 19E shows how to manufacture the electro-magnetic field copy master in the preferred embodiment of the present invention (No. 5);

FIG. 21 shows the electro-magnetic field copy master in another preferred embodiment of the present invention;

FIG. 23A shows how to manufacture the electro-magnetic field copy master in another preferred embodiment (No. 1);

FIG. 23C shows how to manufacture the electro-magnetic field copy master in another preferred embodiment (No. 3);

DESCRIPTION OF THE PREFERRED EMBODIMENTS

The preferred embodiments of the present invention are described below with reference to the drawings.

FIG. 7 shows the electro-magnetic field copy master in the preferred embodiment of the present invention.

The electro-magnetic field copy master 1 shown in FIG. 7 comprises a substrate 2 with concavity and convexity corresponding to servo information on the surface and at least the convex part of which of the concavity and convexity is made of a soft magnetic material with a high electric resistivity and a conductor 3 provided inside the concave part of the substrate 2. In other words, the electro-magnetic field copy master 1 has the array pattern of a soft magnetic material and a conductor which correspond to servo information on the surface. The electric resistivity of the soft magnetic material is set in such a way that no induced current flows even if an external magnetic field is applied when copying the servo information to a vertical storage medium.

Figure 8:
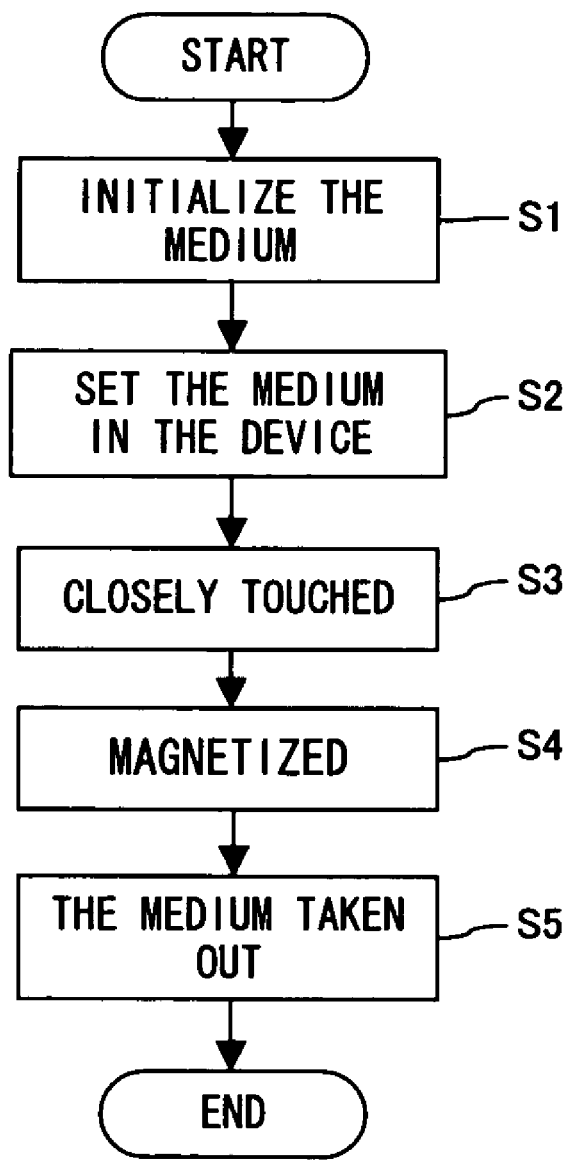
FIG. 8 is a flowchart showing how to manufacture the storage medium of this preferred embodiment.

FIG. 8 is a flowchart showing how to manufacture the storage medium using the electro-magnetic field copy master 1.

Figure 9:
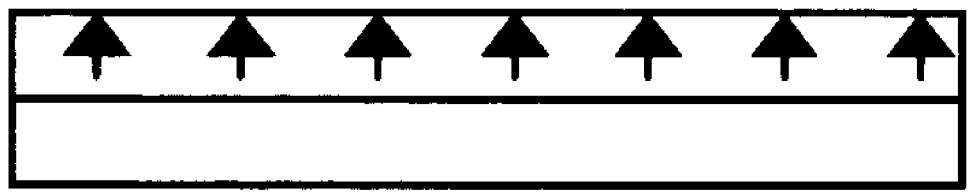
FIG. 9 shows the magnetization direction after the initialization of a vertical storage medium.

First, the magnetization direction of a vertical storage medium is initialized in the direction the reverse of an external magnetic field used when copying servo information to the vertical storage medium, by applying a magnetic field to the vertical storage medium or so on (step S1). For example, as shown in FIG. 9, the magnetization direction of a vertical storage medium 4 is initialized in the direction indicated by an arrow mark, by an initialization device.

Then, the vertical storage medium is set in a non-magnetic holder of the electro-magnetic field copying device provided with the electro-magnetic field copy master 1 (step S2).

Figure 10:
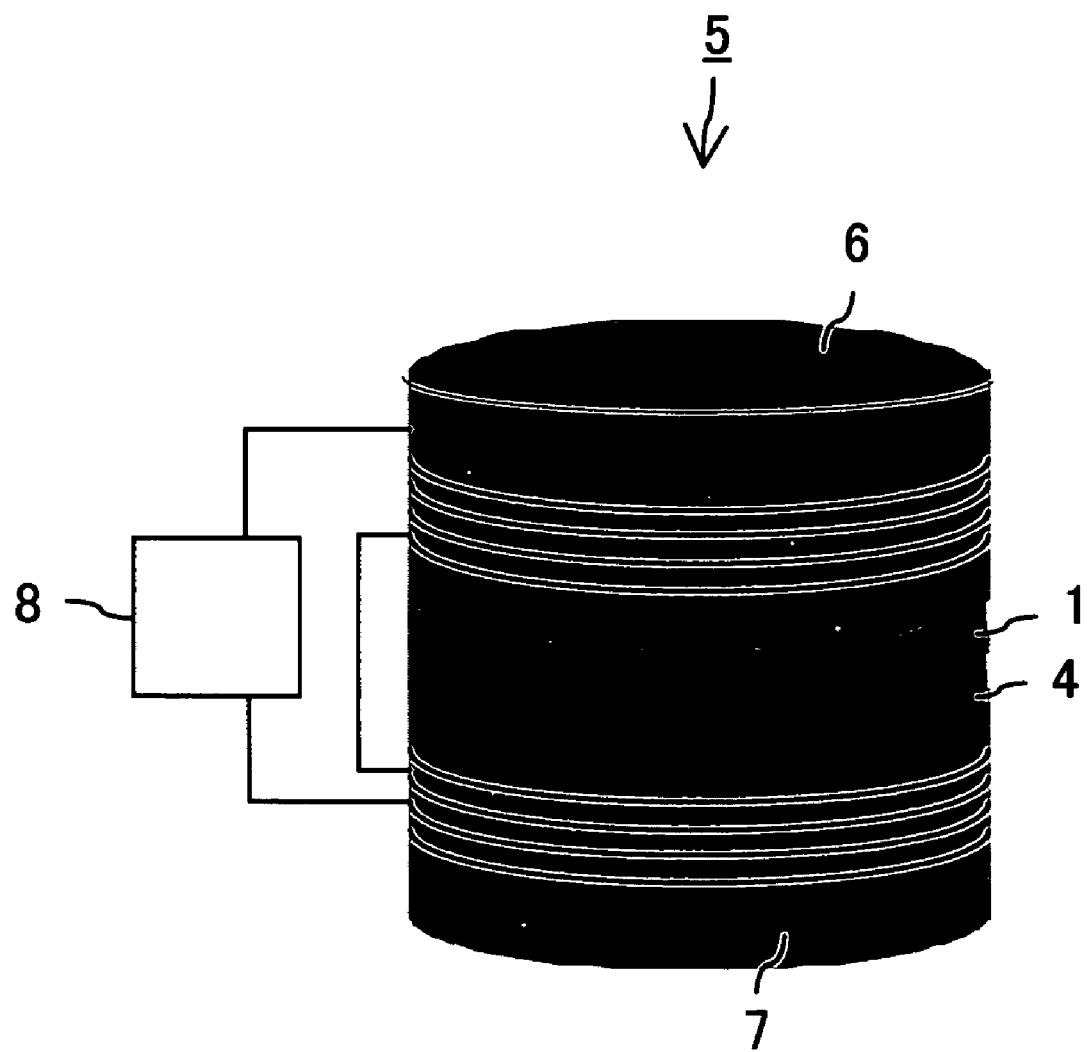
FIG. 10 shows the electro-magnetic field copying device in the preferred embodiment of the present invention.

FIG. 10 shows the electro-magnetic field copying device in the preferred embodiment of the present invention.

The electro-magnetic field copying device 5 shown in FIG. 10 comprises electro-magnets 6 and 7, an electro-magnetic field copy master 1 provided between the electromagnets 6 and 7, and an electro-magnetic field generation unit 8 for instantaneously generating an electro-magnetic field between the electromagnets 6 and 7 by flowing current to the electro-magnets 6 and 7. The electromagnets 6 and 7 are installed in the electro-magnetic field copying device 5 in such a way that the electromagnets 6 and 7 can become N-pole and S-pole, respectively.

FIG. 11 shows one example of the circuit configuration of the electro-magnetic field generation unit 8. The same reference numerals are attached to the same components as shown in FIG. 10.

The electro-magnetic field generation unit 8 shown in FIG. 11 comprises a DC power supply 9 for supplying a power to the electro-magnets 6 and 7 connected in series to each other, switches 10 and 11 provided between the plus terminal of the DC power supply 9 and the electro-magnet 6 which are connected to each other in series, a speed adjustment resistor 12 provided between the minus terminal of the DC power supply 9 and the electro-magnet 7, for adjusting the rise speed of an electro-magnetic field generated between the electro-magnets 6 and 7, and a capacitor 13 provided between the minus terminal of the DC power supply 9 and the contact point of switch contacts 10 and 11. Each of the electro-magnets 6 and 7 comprises a coil 14 (for example, coil with the inductance of 10 or less mH) and an internal resistor 15. The impedance of the internal resistor 15 is, for example, 10 ohms. The switches 10 and 11 are composed of devices with high switching speed, such as a thyristor or the like.

Next, the operation of the electro-magnetic field generation unit 8 is described.

First, the switches 10 and 11 are closed and opened, respectively, to charge the capacitor 13 in such a way as to make one terminal of the capacitor 13 plus. Then, the switches 10 and 11 are opened and closed, respectively, to flow current from the capacitor 13 to the electro-magnets 6 and 7. When the other terminal of the capacitor 13 becomes plus, the switch 11 opens and the generation of the electro-magnetic field between the electro-magnets 6 and 7 terminates. For example, the operation of the switch 11 is controlled and the resistance of the speed adjustment resistor 12 is adjusted, in such a way that the rise speed of the electro-magnetic field generated between the electro-magnets 6 and 7 becomes 1 or more kOe/ms.

Figure 12:
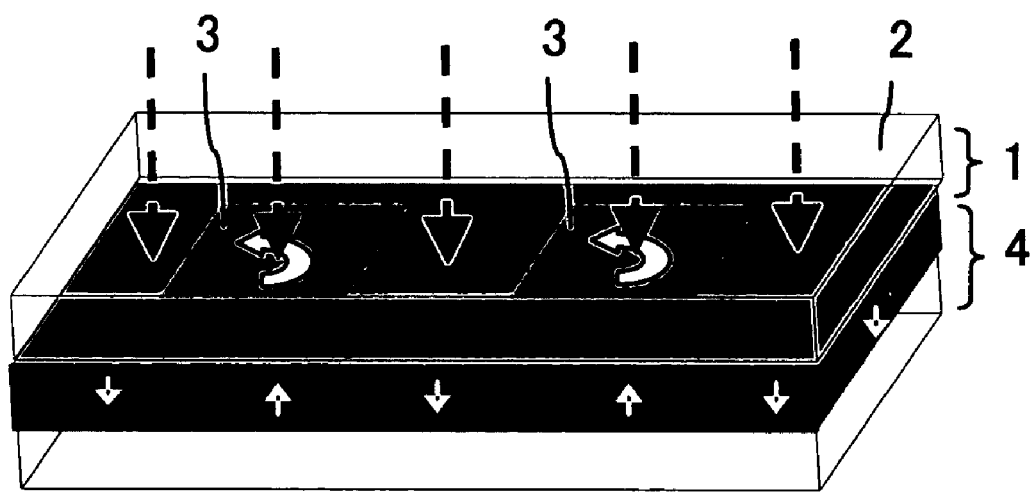
FIG. 12 shows how to copy by the storage medium manufacturing method of this preferred embodiment.

Then, in the flowchart shown in FIG. 8, the electro-magnetic field copy master 1 and the vertical storage medium 4 are closely touched by the holder in such a way that the conductor 3 of the electro-magnetic field copy master 1 and the recording surface of the vertical storage medium 4 are opposed (step S3). For example, the electro-magnetic field copy master 1 and the vertical storage medium 4 are closely touched as shown in FIG. 12. In this case, the electro-magnetic field copy master 1 and the vertical storage medium 4 can also be approached.

Then, the vertical storage medium is magnetized by instantaneously applying an external magnetic field to the vertical storage medium 4 and the electro-magnetic field copy master 1 in the direction perpendicular to the recording surface of the vertical storage medium (step S4). For example, as shown in FIG. 12, an external electro-magnetic field is instantaneously applied to the vertical storage medium 4 and the electro-magnetic field copy master 1 in the direction perpendicular to the recording surface of the vertical storage medium (broken line arrow mark). In this case, the external electro-magnetic field is stronger than the coercive field strength of the vertical storage medium 4.

As described above, when an external electro-magnetic field is instantaneously applied to the vertical storage medium 4 and the electro-magnetic field copy master 1, the magnetization direction of the part of the vertical storage medium 4, in which it closely touches the soft magnetic material in the convex part of the substrate 2 is inverted by the external electro-magnetic field since the external electro-magnetic field is stronger than the coercive field strength of the vertical storage medium 4. Since induced current (curve line arrow mark) flow through the conductor 3 according to the law of electro-magnetic induction, by the instantaneously generated external electro-magnetic field, magnetic field generated by the induced current and the external electro-magnetic field offset each other. Since induced current flows through the conductor 3 according to the intensity of the external electro-magnetic field in this way, the intensity of the external electro-magnetic field applied to the conductor 3 becomes zero even if the intensity and the rise time of the external electro-magnetic field changes. In other words, no external electro-magnetic field is applied to the part of the vertical storage medium 4, in which it closely touches the conductor 3 and the magnetization direction of the part is maintained in the direction at the time of initialization.

Then, the vertical storage medium 4 is taken out of the electro-magnetic field copying device and the copy of servo information to the vertical storage medium 4 terminates (step S5).

Figure 13:
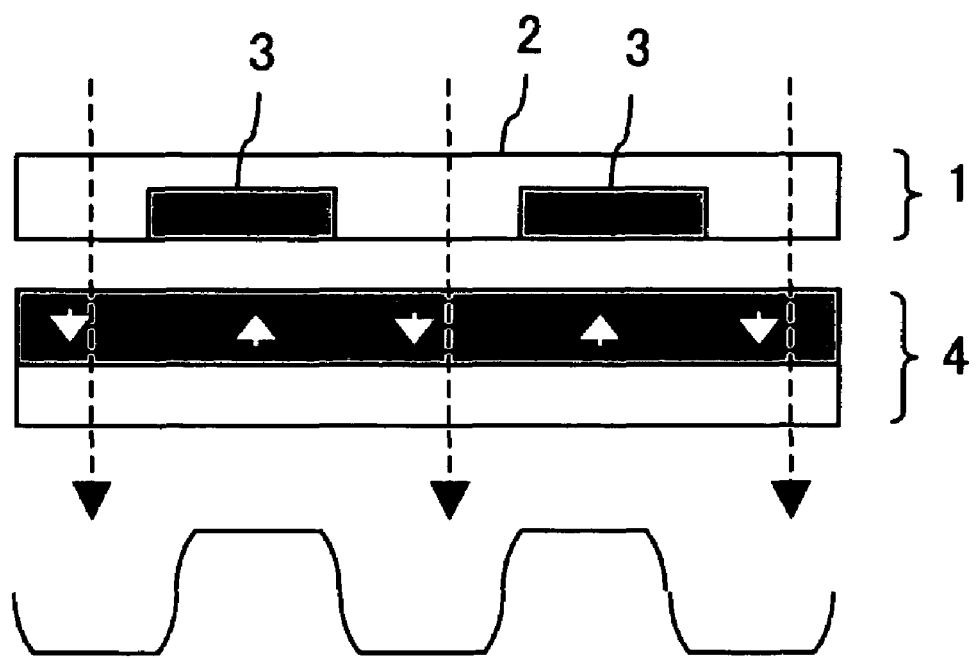
FIG. 13 shows the magnetization direction of a vertical storage medium after the completion of copy and the reproduction waveform of information recorded on the vertical storage medium.

FIG. 13 shows the magnetization direction of a vertical storage medium after the completion of copy (outline type arrow mark) and the reproduction waveform of information recorded on the vertical storage medium. The reproduction waveform shown in FIG. 13 is obtained by setting the vertical storage medium 4 to which the servo information is copied by the storage medium manufacturing method of this preferred embodiment in a tester and observing its waveform.

As shown in FIG. 13, the magnetization direction of the part of the vertical storage medium 4 in which it closely touches the soft magnetic material in the convex part of the substrate 2 is the same direction as the external electro-magnetic field, and the magnetization direction of the part of the vertical storage medium 4 in which it closely touches the conductor 3 is the direction the reverse of the external electro-magnetic field. Since magnetic field contrast distributed in the vertical storage medium 4 can be matched with the concavity and convexity (geometrical shape) of the substrate 2 provided for the electro-magnetic field copy master 1 in this way, the reproduction waveform of the servo information copied to the vertical storage medium 4 can be made the rectangular wave shown in FIG. 13.

Since in the storage medium manufacturing method of this preferred embodiment, its conductor part leaks no magnetic flux even when a sufficiently strong magnetic field is applied, the magnetization of the part is not inverted to completely saturate the magnetization of the part which the soft magnetic material closely touches. Since the magnetization direction of the part of the vertical storage medium 4, in which it closely touches the soft magnetic material in the convex part of the substrate 2 is inverted by an external electro-magnetic field, a diamagnetic field generated inside the soft magnetic material does not affect a magnetic field distributed in the vertical storage medium 4. Since the external electro-magnetic field applied to the conductor 3 is offset by a magnetic field in the direction the reverse of the external electro-magnetic field generated by the induced current flowing through the conductor 3, the position of the magnetic wall of the vertical storage medium 4 does not deviate from the edge of the convex part of the substrate 2 of the electro-magnetic field copy master 1, for example, even when the intensity of the external electro-magnetic field increases due to, for example, temperature change. Therefore, as shown in FIG. 13, the reproduction waveform of the vertical storage medium 4 can be made a rectangular wave corresponding to the concavity and convexity of the substrate 2 of the electro-magnetic field copy master 1, thereby improving the quality of the reproduction waveform.

Since the reproduction waveform of the servo information recorded on the vertical storage medium 4 can be made a rectangular wave by the storage medium manufacturing method of this preferred embodiment, the track density of the vertical storage medium 4 can be improved by recording eccentricity information on the vertical storage medium 4 by the magnetic head after recording the servo information on the vertical storage medium 4 by the storage medium manufacturing method of this preferred embodiment. Since the type of the read channel of the magnetic head, used when reading servo the information and the eccentricity information can be made one, the configuration of the magnetic disk device (for example, hard disk device) provided with the vertical storage medium 4 can be prevented from becoming complex.

Figure 1:
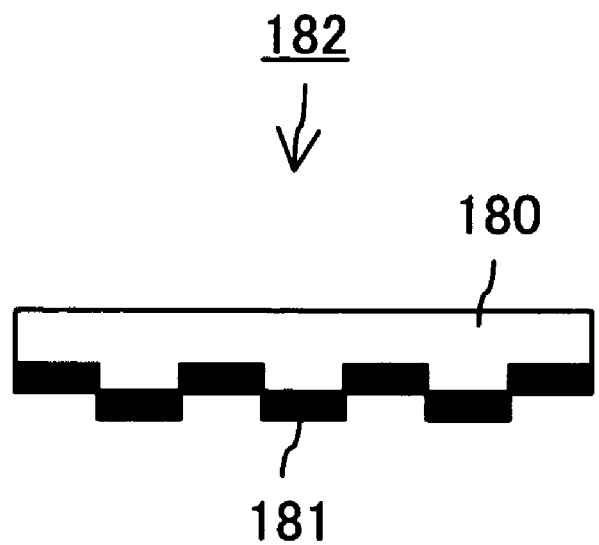
FIG. 1 shows the conventional magnetic copy master.
Figure 2:
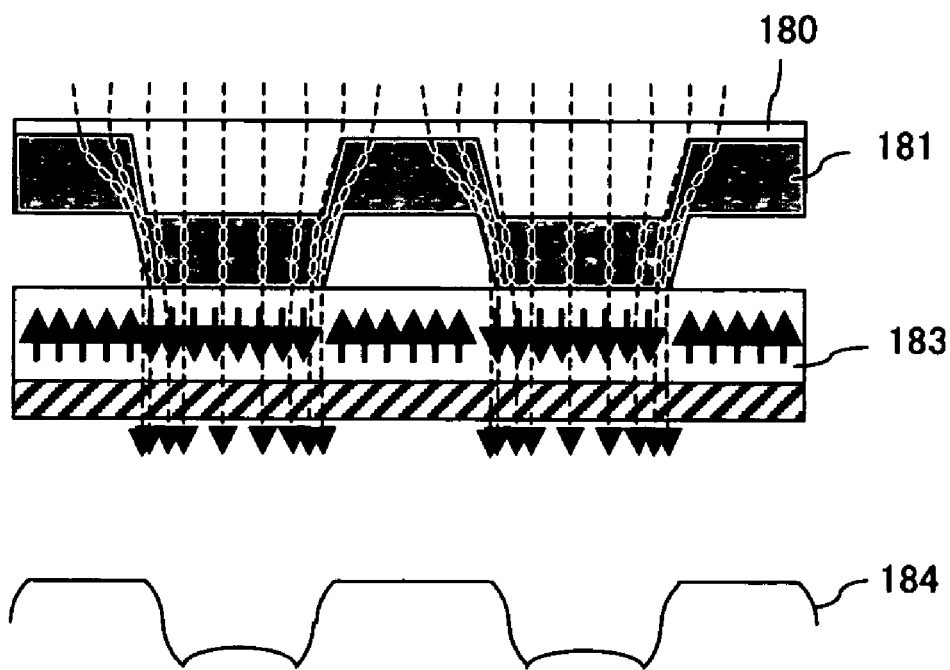
FIG. 2 shows magnetic flux generated when recording information on a vertical storage medium by the conventional magnetic copy master and the reproduction waveform of the vertical storage medium.
Figure 3:
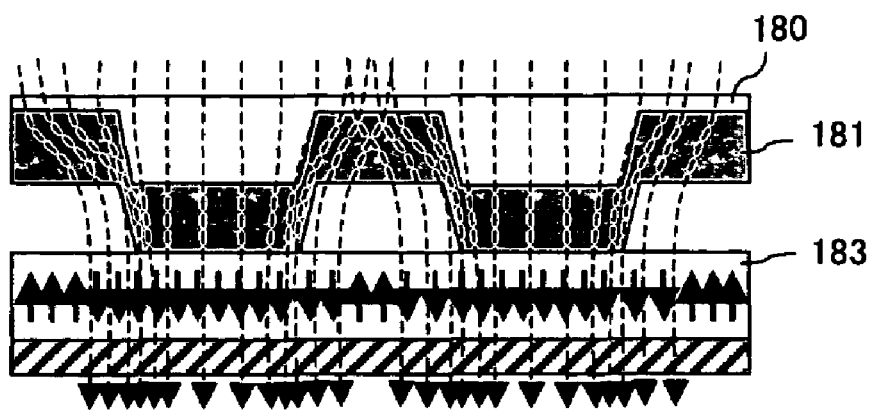
FIG. 3 shows magnetic flux generated if an external magnetic field is large when recording information on a vertical storage medium by the conventional magnetic copy master.
Figure 4:
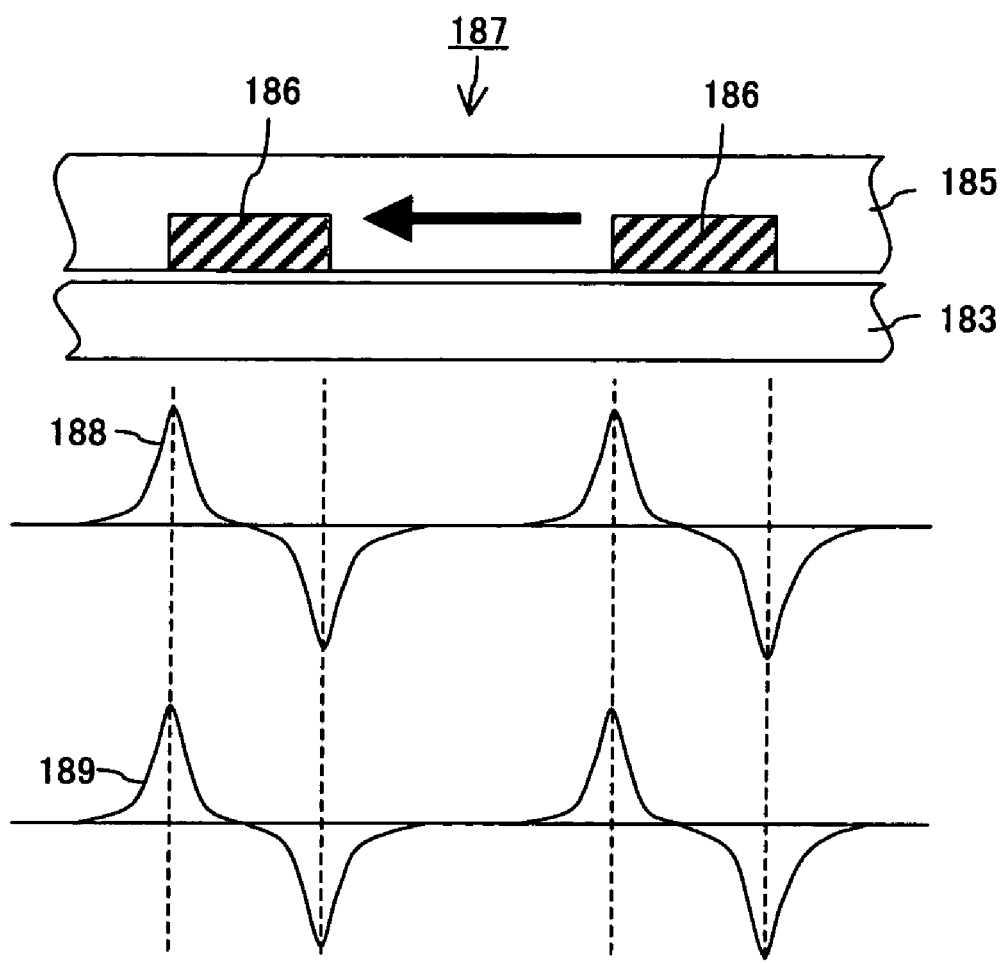
FIG. 4 shows the magnetic copy master used in the conventional vertical storage medium manufacturing method and the reproduction waveform of the vertical storage medium on which information is recorded by the magnetic copy master.
Figure 5:
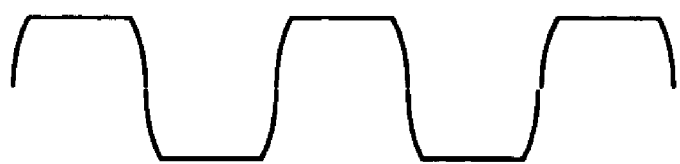
FIG. 5 shows the reproduction waveform of a magnetic disk on which a magnetic head records information.
Figure 6:
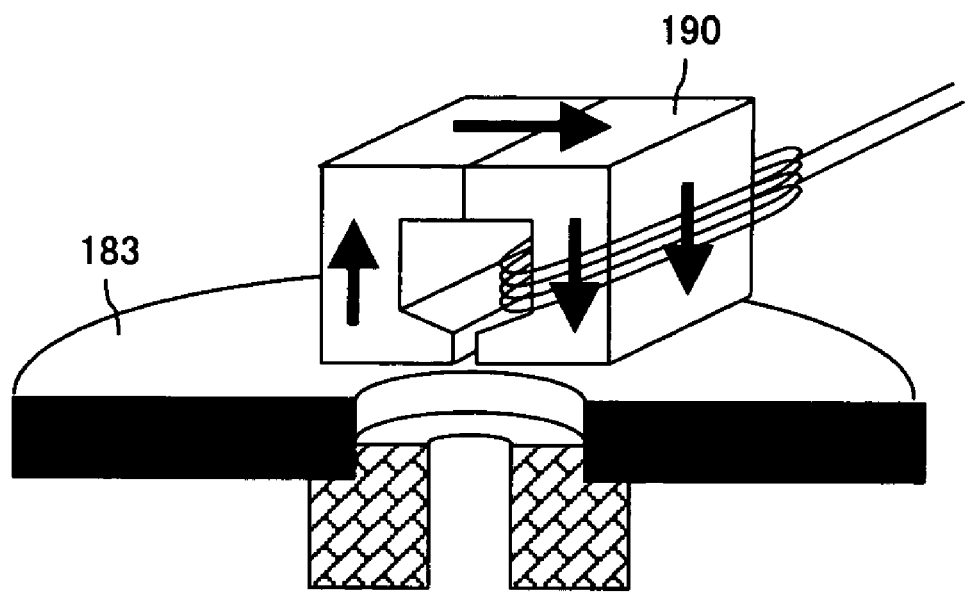
FIG. 6 shows magnetic copy by applying an external magnetic field in the horizontal direction.

Since the storage medium manufacturing method of this preferred embodiment applies an external electro-magnetic field in the direction perpendicular to the recording surface of the vertical storage medium 4 when recording servo information on the vertical storage medium 4, the servo information can be collectively copied from the electro-magnetic field copy master 1 to the vertical storage medium 4, thereby suppressing the copy time and the power consumption. For example, as shown in FIG. 6, when applying an external electro-magnetic field in the horizontal direction using an electro-magnet 190, the external electro-magnetic field of approximately 5 kOe must be continuously applied for approximately one minute. However, in the storage medium manufacturing method of this preferred embodiment, since the rise speed of an electro-magnetic field is 1 or more kOe, the copy time can be suppressed, and also the power consumption can be reduced to approximately one-twentieth.

In the storage medium manufacturing method of this preferred embodiment, since the external electro-magnetic field can be instantaneously generated, the power consumption can be suppressed accordingly.

In the storage medium manufacturing method of this preferred embodiment, since the position of the magnetic wall of the vertical storage medium 4 does not deviate from the edge of the convex part of the substrate 2 of the electro-magnetic field copy master 1 even when the intensity of the external electro-magnetic field changes, the intensity of the external electro-magnetic field can have a margin.

In the storage medium manufacturing method of this preferred embodiment, since the position of the magnetic wall of the vertical storage medium 4 does not deviate from the edge of the convex part of the substrate 2 of the electro-magnetic field copymaster 1, the mask pattern of the concavity and convexity of the substrate 2 can be designed without considering the position deviation.

Figure 14:
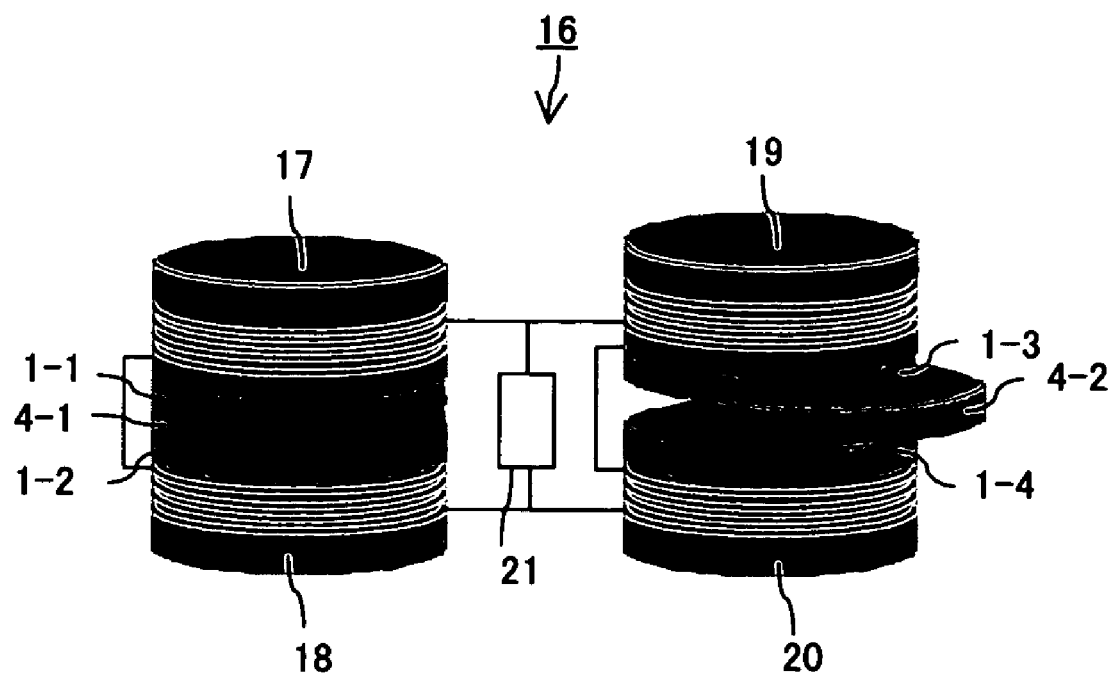
FIG. 14 shows the electro-magnetic copying device in another preferred embodiment of the present invention.

FIG. 14 shows the electro-magnetic copying device in another preferred embodiment of the present invention. The same reference numerals are attached to the same components as shown in FIG. 10.

The electro-magnetic field copying device 16 shown in FIG. 14 comprises electro-magnetic field copy masters 1-1~1-4, electro-magnets 17 and 18, electro-magnets 19 and 20 and an electro-magnetic generation unit 21 for instantaneously generating an electro-magnetic field between the electro-magnets 17 and 18 and also between the electro-magnets 19 and 20 by flowing current through them. The electro-magnets 17~20 are installed in the electro-magnetic field copying device 16 in such a way that the electro-magnets 17, 18, 19 and 20 become N-pole, S-pole, S-pole and N-pole, respectively. The magnetic field copy masters 1-1 and 1-2 are inserted between electro-magnets 17 and 18 in such a way that their respective conductors 3 may face each other. The magnetic field copy masters 1-3 and 1-4 are inserted between electro-magnets 19 and 20 in such a way that their respective conductors 3 may face each other.

Each of the electro-magnetic field copy masters 1-1~1-4 is configured the same as the electro-magnetic field copy master 1.

Figure 15:
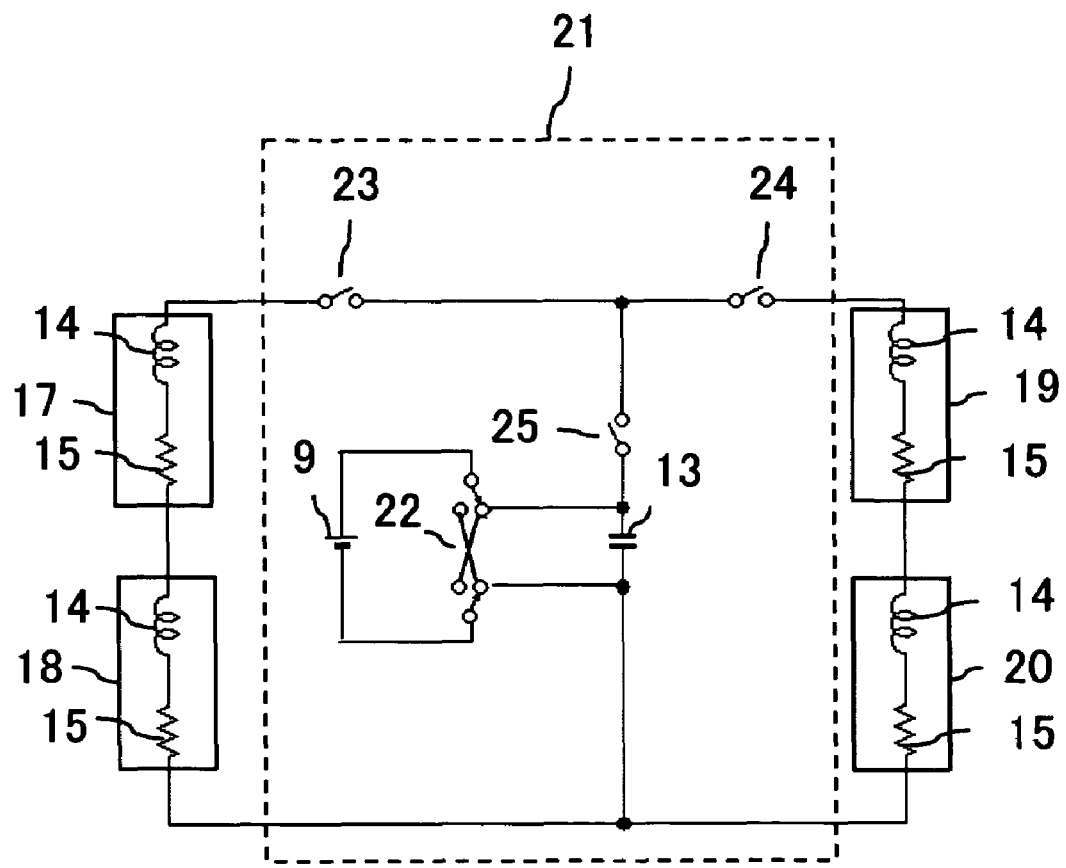
FIG. 15 shows one example of the circuit configuration of the electro-magnetic field generation unit of the electro-magnetic copy device in another preferred embodiment.

FIG. 15 shows one example of the circuit configuration of the electro-magnetic field generation unit 21. The same reference numerals are attached to the same components as shown in FIG. 11 or 14.

The electro-magnetic field generation unit 21 shown in FIG. 15 comprises a DC power supply 9, a capacitor 13, a polarity inversion switch 22 provided between the DC power supply 9 and the capacitor 13, switches 23 and 24 provided between the electro-magnets 17 and 19 which are connected to each other in series and a switch 25 provided between the capacitor 13 and the contact point of the switches 23 and 24. Each of the electro-magnets 17~20 comprises a coil 14 and an internal resistor 15. The switches 23 and 24 are connected to the electro-magnets 17 and 19, respectively. Each of the switches 23, 24 and 25 is composed of devices with high switching speed, such as a thyristor or the like. A speed adjustment resistor 12 can also be provided between the capacitor 13 and the electro-magnet 18 and between the capacitor 13 and the electro-magnet 20.

Next, the operation of the electro-magnetic field generation unit 21 is described.

First, the capacitor 13 is charged so that the terminal of the capacitor 13, connected to the switch 25 may become plus, by operating the polarity inversion switch 22. Then, the polarity inversion switch 22 is opened and the DC power supply 9 is removed from the capacitor 13. Then, the switches 23 and 24 are closed and opened, respectively. Then, the switch 25 is closed to flow current from the capacitor 13 to the electro-magnets 17 and 18. Then, the terminal of the capacitor 13, connected to the electromagnet 18 becomes plus to open the switch 25 before electric charge accumulated in the capacitor 13 flows backward. Thus, the generation of an electro-magnetic field between the electro-magnets 17 and 18 terminates. For example, the operation of the switch 25 is controlled so that the rise speed of the electro-magnetic field generated between the electro-magnets 17 and 18 may become 1 or more kOe/ms. Then, by operating the polarity inversion switch 22, the capacitor 13 is charged by the amount consumed by the respective internal resistors 15 of the electro-magnets 17 and 18 so that the terminal connected to the electro-magnet 18 may become plus.

Then, when the capacitor 13 is sufficiently charged so that the terminal of the capacitor 13, connected to the electromagnet 18 may become plus, the polarity inversion switch 22 is opened and the DC power supply 9 is removed from the capacitor 13. Then, the switches 23 and 24 are opened and closed, respectively. Then, the switch 25 is closed to flow current from the capacitor 13 to the electro-magnets 19 and 20. Then, the terminal of the capacitor 13, connected to the electro-magnet 19 becomes plus to open the switch 25 before the electric charge accumulated in the capacitor 13 flows backward. Thus, the generation of the electro-magnetic field between the electro-magnets 19 and 20 terminates. For example, the operation of the switch 25 is controlled in such a way that the rise speed of the electro-magnetic field generated between the electro-magnets 19 and 20 becomes 1 or more kOe/ms. Then, by operating the polarity inversion switch 22, the capacitor 13 is charged by the amount consumed by the respective internal resistors 15 of the electro-magnets 19 and 20 so that the terminal connected to the switch 25 may become plus.

By the above-described series of operations, after generating an electro-magnetic field in the electro-magnets 17 and 18, an electro-magnetic field can be generated in the electro-magnets 19 and 20. Then, in order to continue to further generate an electro-magnetic field in the electro-magnets 17 and 18 and the electro-magnets 19 and 20, the above-described series of operations is repeated.

Although the electro-magnetic field copying device 16 flows current through the electro-magnets 17 and 18 and the electro-magnets 19 and 20, using one DC power supply 9 to alternatively generate two electro-magnetic fields, the same circuit as the circuit comprising the electro-magnets 17 and 18 and the switch 23 can be connected to the circuit comprising the electro-magnets 17 and 18 and the switch 23 in parallel and three or more electro-magnetic fields can also alternatively be generated, using one DC power supply 9.

Since the electro-magnetic field copying device 16 is configured to generate two or more electro-magnetic fields, using one DC power supply 9 can also use the electric charge accumulated in the capacitor 13 at the time of the previous generation of an electro-magnetic field at the time of the subsequent generation of it in this way, and power consumption can be reduced, compared with the electro-magnetic field copying device 5 shown in FIG. 10.

Next, the storage medium manufacturing method in the case where the electro-magnetic field copying device 16 shown in FIG. 14 collectively records each piece of servo information on both surfaces of the vertical storage medium 4-1 and both surfaces of the vertical storage medium 4-2 is described.

(1) The magnetization direction of each of the surfaces of the vertical storage media 4-1 and 4-2 is initialized in the direction perpendicular to the recording surface of the vertical storage medium 4. In this case, the magnetization direction of each of both surfaces of the vertical storage media 4-1 and 4-2 is initialized in the direction the reverse of an external electro-magnetic field.

(2) The electro-magnetic field copy masters 1-1 and 1-2 are closely touched to the vertical storage medium 4-1 in such a way that the conductor 3 of each of the electro-magnetic field copy masters 1-1 and 1-2 opposes each recording surface of the vertical storage medium 4-1. Simultaneously, the electro-magnetic field copy masters 1-3 and 1-4 are closely touched to the vertical storage medium 4-2 in such a way that the conductor 3 of each of the electro-magnetic field copy masters 1-3 and 1-4 opposes each recording surface of the vertical storage medium 4-2. As described above, each of the electro-magnetic field copymasters 1-1~1-4 can also approached to the vertical storage media 4-1 and 4-2, respectively. In the electro-magnetic field copying device 16 shown in FIG. 14, since the direction of the electro-magnetic field generated in the electro-magnets 17 and 18 and the direction of the electro-magnetic field generated in the electro-magnets 19 and 20 are opposite to each other, the vertical storage media 4-1 and 4-2 are set in the electro-magnetic field copying device 16 in such a way that the magnetization direction of the vertical storage medium 4-1 and the magnetization direction of the vertical storage medium 4-2 are opposite to each other.

(3) After applying an external electro-magnetic field to the vertical storage medium 4-1 and the electro-magnetic field copy masters 1-1 and 1-2 in the direction perpendicular to the recording surface of the vertical storage medium 4-1, an external electro-magnetic field is applied to the vertical storage medium 4-2 and the electro-magnetic field copy masters 1-3 and 1-4 in the direction perpendicular to the recording surface of the vertical storage medium 4-2. In this case, each external electro-magnetic field is stronger than the coercive field strength of the vertical storage medium 4-1 or 4-2.

Since servo information can be collectively recorded on both surfaces of each of the vertical storage media 4-1 and 4-2 in this way, tact time can be reduced.

Since the capacitor 13 is instantaneously charged, there is hardly any electro-magnetic field copy time.

If servo information is recorded on both faces of each of new vertical storage media 4-1 and 4-2, the above (1)~(3) are repeatedly applied to the new vertical storage media 4-1 and 4-2.

If the same servo information is recorded on each of both surfaces of the vertical storage medium 4-1 (or vertical storage medium 4-2), the concavity and convexity of the substrate 2 of each of the electro-magnetic field copy masters 1-1 and 1-2 (or electro-magnetic field copy masters 1-3 and 1-4) is inverted with respect to each other. Thus, each piece of servo information recorded on both surfaces of the vertical storage medium 4-1 (or vertical storage medium 4-2) can be read in the same polarity.

Next, the manufacturing method of the electro-magnetic field copy master 1 is described.

Figure 16:
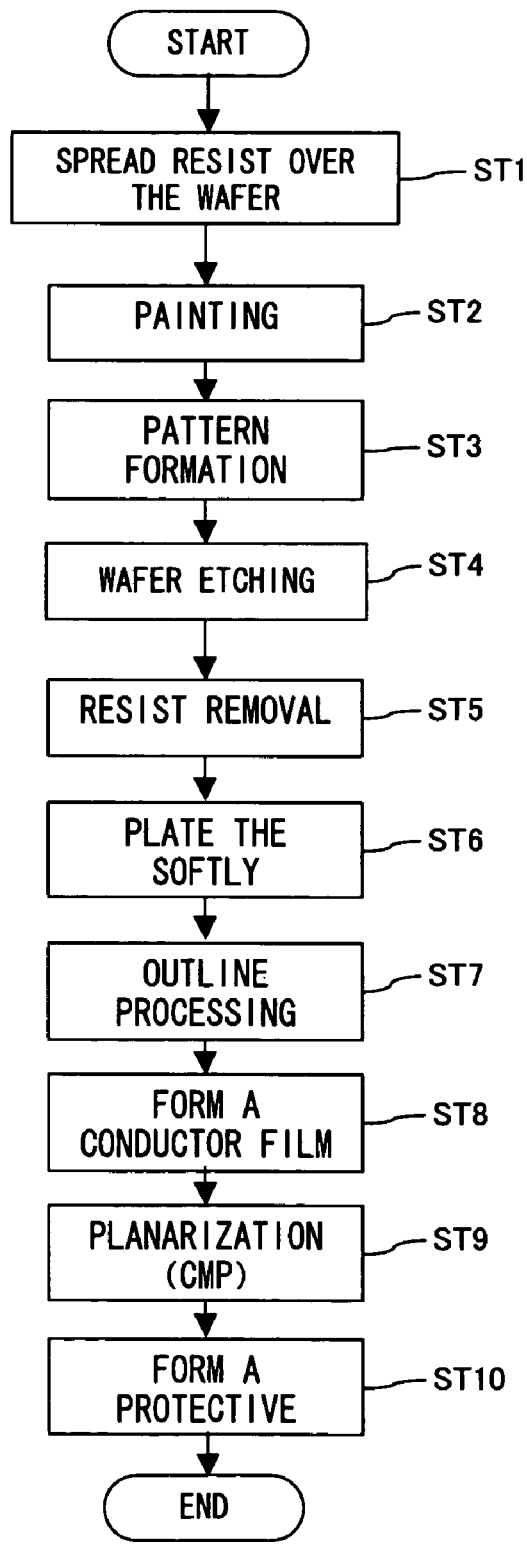
FIG. 16 is a flowchart illustrating how to manufacture the electro-magnetic field copy master in the preferred embodiment of the present invention.

FIG. 16 is a flowchart illustrating how to manufacture the electro-magnetic field copy master 1. The manufacturing method of this electro-magnetic field copy master 1 is the same as, for example, that of the sputter of an optical disk.

First, electron beam resist is spread on a Si wafer (step ST1). This Si forms the substrate 2 of the electro-magnetic field copy master 1.

Figure 17:
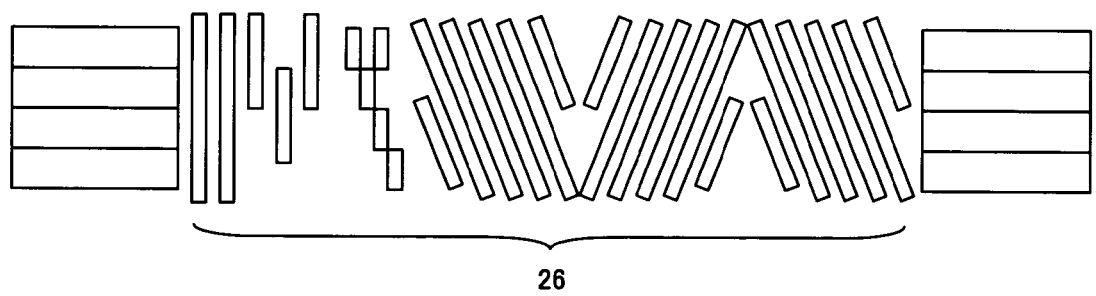
FIG. 17 shows one example of the pattern of servo information.

Then, a pattern corresponding to servo information is painted on the electro beam resist by an electron beam painting device or the like (step ST2). For example, the pattern corresponding to the servo information 26 shown in FIG. 17 or 18 is painted.

Then, in order to form a pattern corresponding to servo information, electron beam resist other than the pattern is removed (step ST3). Then, as shown in FIG. 19A, the electron beam resist 28 of the pattern corresponding to servo information is formed on the wafer 27.

Then, the wafer is etched (step ST4). For example, the wafer 27 is etched up to the depth of 100 nm by applying reactive etching (RIE) to it for 60 seconds in the environment of SF6 (sulfur gas 6-fluoride) of 1 Pa and 15 cc/min. Then, as shown in FIG. 19B, concavity and convexity corresponding to servo information is formed on the wafer 27.

Then, the electron beam resist on the wafer is removed by ashing (step ST5). For example, ashing is applied to the wafer for three minutes in the environment of oxygen of 10 Pa and 100 cc/min.

Then, a soft magnetic film with high electric resistivity is formed on the concavity and convexity of the wafer by non-electrolytic plating (step ST6). For example, the soft magnetic film is FeCoNi. Then, as shown in FIG. 19C, a soft magnetic film 29 is plated on the concavity and convexity of the wafer 27. This soft magnetic film 29 forms the convex part of the concavity and convexity of the substrate 2 of the electro-magnetic field copy master 1. Since grain boundary is deposited in the soft magnetic film 29 formed by non-electrolytic plating, the electric resistivity increases. For example, the soft magnetic film 29 is formed in such a way that its electric resistivity becomes $1\times10^{-6}$ $\Omega$m.

Then, the respective size of the wafer and the soft magnetic film is processed to a prescribed size by an outline processing device (step ST7). For example, the respective diameters of the wafer and the soft magnetic film are processed from 3 inches to 2.5 inches.

Figure 19D:
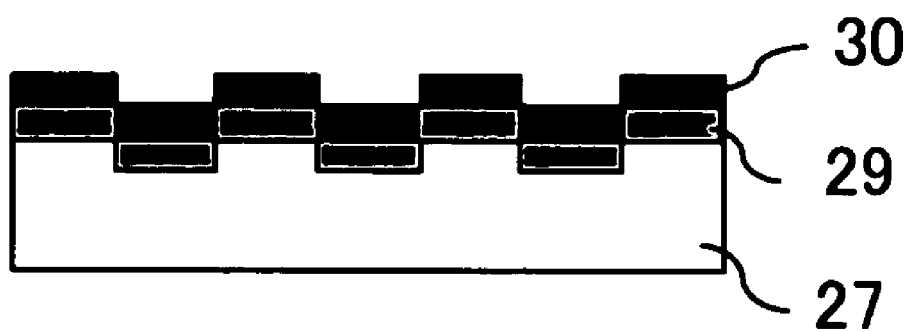
FIG. 19D shows how to manufacture the electro-magnetic field copy master in the preferred embodiment of the present invention (No. 4)

Then, a conductor film is formed on the concavity and convexity of the soft magnetic film by sputtering (step ST8). For example, the conductor film is made of copper and its electric resistivity is $5\times10^{-8}$ $\Omega$m. The conductor film can also be made of silver or gold. Then, as shown in FIG. 19D, the conductor film-30 is formed on the concavity and convexity of the soft magnetic film 29. This conductor film 30 on the concavity and convexity of the soft magnetic film 29 forms the conductor 3 of the electro-magnetic field copy master 1.

Then, the conductor film is polished and planarized up to the surface of its adjacent soft magnetic film (step ST9). For example, the conductor film is polished by chemical mechanical planarization (CMP). Then, as shown in FIG. 19E, the soft magnetic film 29 and the conductor film 30 are planarized.

Then, a protective coat is formed on the planarized soft magnetic film and conductor film by sputtering (step ST10). For example, a 2 nm-thick diamond-like carbon (DLC) protective coat is formed.

Figure 20:
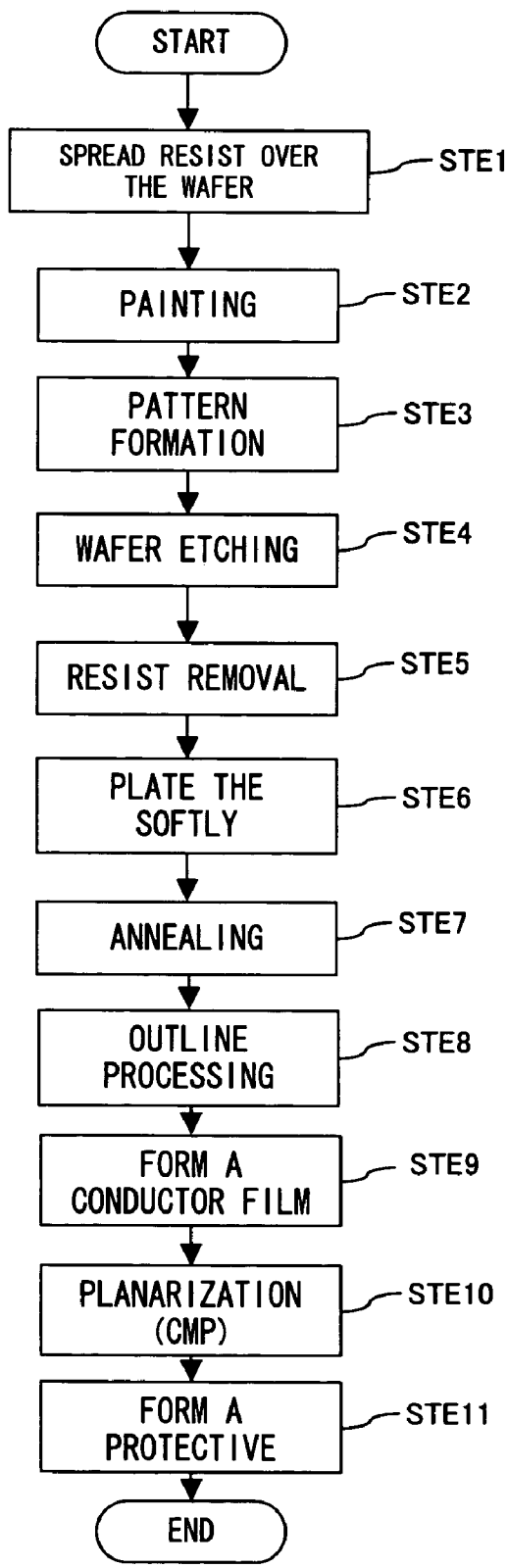
FIG. 20 is the flowchart of another manufacturing method of the electro-magnetic field copy master in the preferred embodiment of the present invention.

FIG. 20 is the flowchart of another manufacturing method of the electro-magnetic field copy master 1.

The flowchart shown in FIG. 20 differs from that shown in FIG. 16 in that the process of reducing the electric resistivity of the soft magnetic film by annealing it (step STE7) between the plating process of the soft magnetic film (step STE6) and the outline processing process (step STE7) is added.

The following Table 1 shows the respective degree of the deviation between the edge of the reproduction waveform and the edge of the convex part of the substrate 2, of the vertical storage medium in the case where the plated softly magnetic film (FeCoNi) is annealed and where the plated soft magnetic film (FeCoNi) is not annealed or where the soft magnetic film (FeCo) is formed by sputtering and the conductor film is made of Cu (copper), Cr (chrome) or Ti (titanium). In this case, the electric resistivity of the soft magnetic film in the case where the plated soft magnetic film is annealed, the electric resistivity of the soft magnetic film in the case where the plated soft magnetic film is not annealed, the electric resistivity of the soft magnetic film formed by sputtering, the electric resistivity of Cu, the electric resistivity of Cr and the electric resistivity of Ti are $8\times10^{-7}$ $\Omega$m, $1\times10^{-6}$ $\Omega$m, $5\times10^{-6}$ $\Omega$m, $5\times10^{-8}$ $\Omega$m, $3\times10^{-7}$ $\Omega$m and $8\times10^{-7}$ $\Omega$m, respectively. If there is no deviation between the edge of the reproduction waveform and the edge of the convex part of the substrate 2, it is expressed by ○. If there is small deviation, it is expressed by Δ. If there is large deviation, it is expressed by X.

According to the following Table 1, it is found that if the electric resistivity ratio of the soft magnetic film to the conductor film is one digit or more, the edge of the reproduction waveform of information copied to the vertical storage medium by the electro-magnetic field copy master 1 does not largely deviate from the edge of the convex part of the concavity and convexity of the substrate 2 of the electro-magnetic field copy master 1.

TABLE 1

| Softly magnetic film | Conductor film | | |
|---|---|---|---|
| | Cu ($5 \times 10^{-8}$ $\Omega$m) | Cr ($3 \times 10^{-7}$ $\Omega$m) | Ti ($8 \times 10^{-7}$ $\Omega$m) |
| FeCoNi With plate annealing ($8 \times 10^{-7}$ $\Omega$m) | ○ | Δ | X |
| FeCoNi Without plate annealing ($1 \times 10^{-6}$ $\Omega$m) | ○ | Δ | Δ |
| FeCo Sputtering ($5 \times 10^{-6}$ $\Omega$m) | ○ | ○ | ○ |

Next, the electro-magnetic field copy master in another preferred embodiment of the present invention is described. FIG. 21 shows the electro-magnetic field copy master in another preferred embodiment of the present invention. The same reference numerals are attached to the same components as shown in FIG. 7 or 19E.

The electro-magnetic field copy master 31 as shown in FIG. 21 comprises a substrate 32 which has concavity and convexity corresponding to servo information on the surface and is made of polycarbonate (PC), a soft magnetic film 29 formed on the concavity and convexity of the substrate 32 and a conductor 3 provided in the concave part of the soft magnetic film 29, specifically provided in the concave part of the concavity and convexity of a substrate composed if the soft magnetic film 29 and the substrate 32. The storage medium manufacturing method using this electro-magnetic field copy master 31 is the same as that of the above-described storage medium manufacturing method. In this storage medium manufacturing method, the track density of the vertical storage medium can be improved while improving the quality of the reproduction waveform of information recorded on the vertical storage medium, and also copy time and power consumption can be suppressed.

In the storage medium manufacturing method using this electro-magnetic field copy master 31, since the substrate 32 is made of polycarbonate, the vertical storage medium and the electro-magnetic field copy master 31 can be closely touched when copying servo information on the vertical storage medium. Therefore, the contrast of a magnetic field distributed in the vertical storage medium can be improved to further improve the quality of the reproduction waveform.

Figure 22:
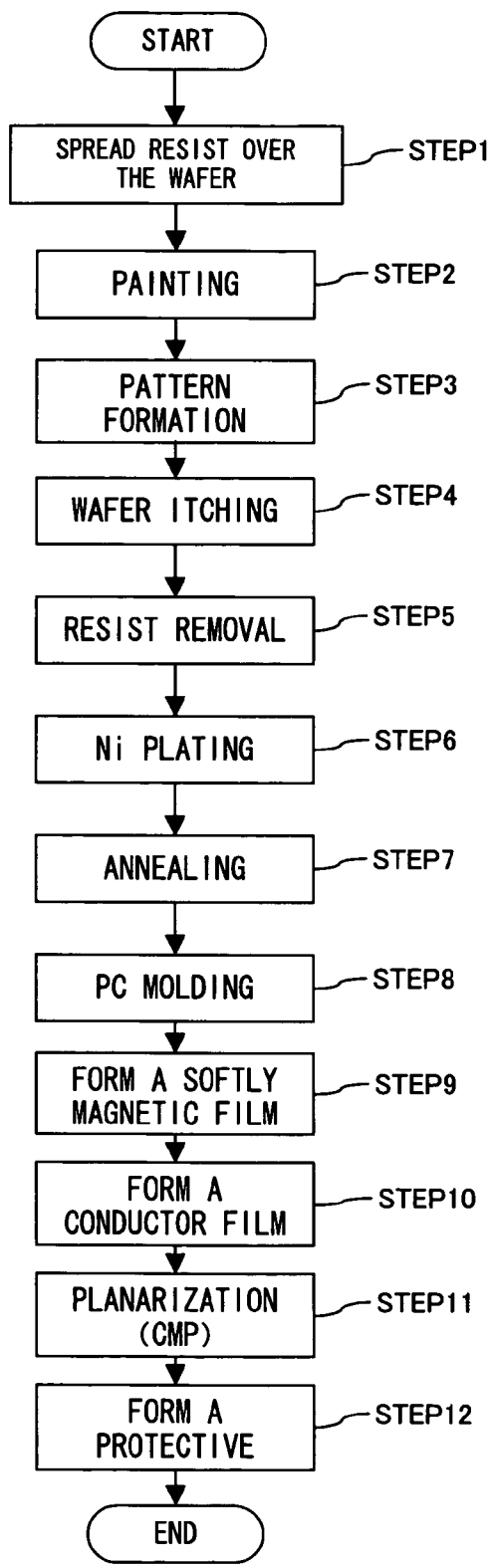
FIG. 22 is a flowchart showing how to manufacture the electro-magnetic field copy master in another preferred embodiment of the present invention.

FIG. 22 is a flowchart showing how to manufacture the electro-magnetic field copy master 31. Since the processes up to the process of removing the electro beam resist (step STEP5) of this flowchart are the same as the process of removing the electro beam resist (step ST5) of the flowchart shown in FIG. 16, its description is omitted here.

Then, after a Ni electrode layer is formed on the concavity and convexity of the wafer by sputtering, Ni is plated on the electrode layer by electric plating (step STEP6). For example, 300 μm of Ni is electrically plated on the electrode layer. Then, as shown in FIG. 23A, Ni 33 is plated on the concavity and convexity of the wafer 27.

Then, after the wafer is removed from the Ni, the size of the Ni is processed to a prescribed size by an outline processing device (step STEP7). For example, the diameter of Ni plated on the Si wafer is processed from 8 inches to 2.5 inches.

Figure 23B:
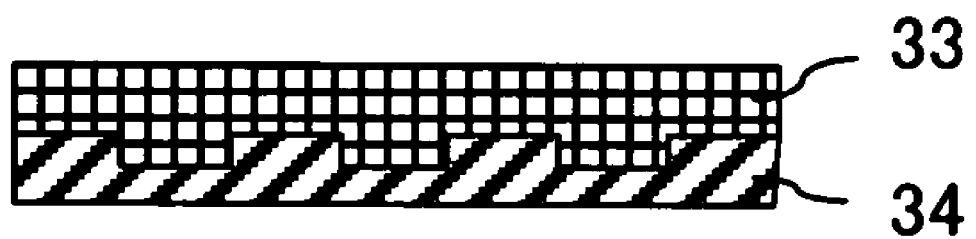
FIG. 23B shows how to manufacture the electro-magnetic field copy master in another preferred embodiment (No. 2)

Then, concavity and convexity corresponding to the servo information is formed on the polycarbonate surface, using the Ni as a metal mold (step STEP8). For example, concavity and convexity corresponding to the servo information is formed on the polycarbonate surface, using a 100-ton optical disk substrate molding machine at the polycarbonate temperature of 300 degrees and at the Ni temperature of 130 degrees for the molding time of 90 seconds. This polycarbonate forms the substrate 32 of the electro-magnetic field copymaster 31. Then, as shown in FIG. 23B, the concavity and convexity corresponding to that of the Ni 33 is formed on the surface of the polycarbonate 34.

Then, a soft magnetic film is formed on the concavity and convexity of the polycarbonate by sputtering (step STEP9). For example, the soft magnetic film is FeCo. Then, as shown in FIG. 23C, a soft magnetic film 29 is formed on the concavity and convexity of the polycarbonate 34.

Figure 23D:
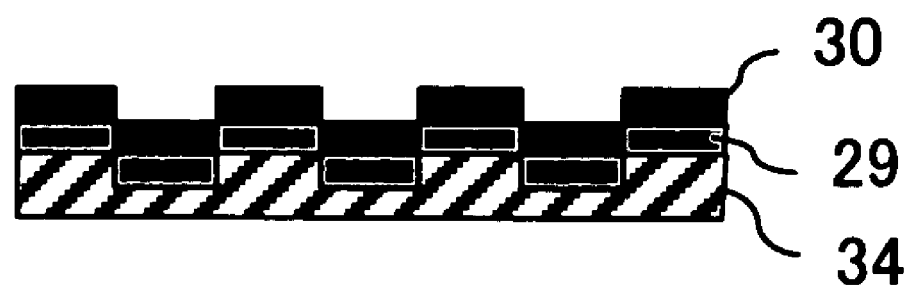
FIG. 23D shows how to manufacture the electro-magnetic field copy master in another preferred embodiment (No. 4)

Then, a conductor film is formed on the concavity and convexity of the soft magnetic film by sputtering (step STEP10). For example, Al (aluminum) with the thickness of 100 m and the electric resistivity of $7\times10^{-8}$ $\Omega$m is formed on the concavity and convexity of the soft magnetic film by RF magnetron sputter in the environment of Ar gas of 2 Pa. Then, as shown in FIG. 23D, a conductor film 30 is formed on the concavity and convexity of the soft magnetic film 29.

Figure 23E:
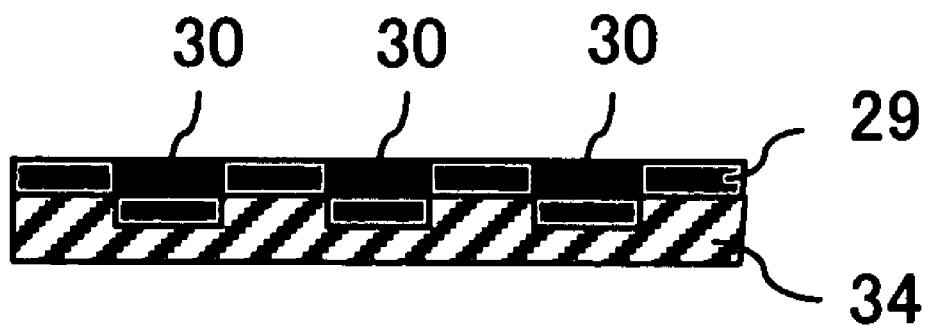
FIG. 23E shows how to manufacture the electro-magnetic field copy master in another preferred embodiment (No. 5).

Then, the conductor film is polished and planarized up to the surface of an adjacent soft magnetic film (step STEP11) For example, the conductor film is polished by CMP. Then, as shown in FIG. 23E, the soft magnetic film 29 and the conductor film 30 are planarized.

Then, a protective coat is formed on the planarized soft magnetic film and conductor film (step STEP12). For example, a 2 nm-thick SiN protective coat is formed.

Although in the above-described preferred embodiments, servo information is copied to the vertical storage medium, prescribed information other than servo information (such as, audio information, video information or the like) can also be copied to the vertical storage medium.

Although in the above-described preferred embodiments, concavity and convexity corresponding to prescribed information is formed on the substrate, using electron beam resist, the concavity and convexity corresponding to prescribed information can also be formed, using laser, an electron beam, an ion beam, mechanical processing or the like.

The forming method of the soft magnetic film and the conductor film is not limited to sputtering of a vacuum deposition method, an ion plating method, a chemical vapor deposition (CVD) method or the like.

The material of the substrate 2 of the electro-magnetic field copy master 1 is not limited to Si and glass can also be used.

The substrate 32 of the electro-magnetic field copy master 31 can also be made of resin other than polycarbonate.

A magnetic disk device provided with a vertical storage medium to which servo information is copied by the storage medium manufacturing method of the above-described preferred embodiment (for example, hard disk device) can also be configured.

What is claimed is:

1. A method with a process of copying prescribed information from an electro-magnetic field copy master, for manufacturing a perpendicular magnetic record medium, the copying process comprising:
    initializing a magnetization direction of the perpendicular magnetic record medium in a direction which is the reverse of a direction of an external electro-magnetic field;
    closely touching or approaching the perpendicular magnetic record medium on or to the electro-magnetic field copy master provided with a substrate which has concavity and convexity corresponding to the prescribed information on the surface and at least the convex part of which of the concavity and convexity is made of a soft magnetic material, and a conductor is provided above a concave part of the substrate wherein a lower surface of the conductor and a lower surface of the soft magnetic film on the convex part are approximately in the same plane; and
    instantaneously applying an external electro-magnetic field stronger than coercive field strength of the perpendicular magnetic record medium to the perpendicular magnetic record medium and the electro-magnetic field copy master.

2. The manufacturing method of a perpendicular magnetic record medium according to claim 1, wherein
    a rise speed of the external electro-magnetic field is 1 or more kOe/ms.

3. A perpendicular magnetic record medium to which prescribed information is copied by the manufacturing method of a perpendicular magnetic record medium according to claim 1.

4. A magnetic disk device provided with a perpendicular magnetic record medium to which prescribed information is copied by the manufacturing method of the perpendicular magnetic record medium according to claim 1.

5. The manufacturing method of a perpendicular magnetic storage medium according to claim 1, wherein the soft magnetic material is formed inside the concave part and the conductor is formed directly on the soft magnetic material formed in the concave part.

6. An electro-magnetic field copy master used to copy prescribed information to a recording surface of a perpendicular magnetic record medium, comprising:
    a substrate which has concavity and convexity corresponding to the prescribed information on a surface and at least the convex part of which of the concavity and convexity is made of a soft magnetic material; and
    a conductor is provided above the concave part of the substrate, wherein a lower surface of the conductor and a lower surface of the soft magnetic film on the convex part are approximately in the same plane.

7. The electro-magnetic field copy master according to claim 6, wherein
    an electric resistivity ratio of the soft magnetic field to the conductor is one digit or more.

8. The electro-magnetic field copy master according to claim 6, wherein
    the conductor is made of copper, silver, aluminum or gold.

9. The electro-magnetic field copy master according to claim 6, wherein
    the soft magnetic material is made of FeCoNi in which grain boundary is deposited.

10. The electro-magnetic field copy master according to claim 6, wherein the soft magnetic material is formed inside the concave part and the conductor is formed directly on the soft magnetic material formed in the concave part.

11. An electro-magnetic field copying device for copying prescribed information from an electro-magnetic field copy master to a perpendicular magnetic record medium by applying an external electro-magnetic field to the perpendicular magnetic record medium and the electro-magnetic field copy master in a direction perpendicular to a recording surface of the perpendicular magnetic record medium while the electro-magnetic field copy master is closely touched on or approached to the perpendicular magnetic record medium, comprising:
    an electro-magnetic field copy master provided with a substrate which has concavity and convexity corresponding to the prescribed information on the surface and at least a convex part of which of the concavity and convexity is made of a soft magnetic material, a conductor is provided above a concave part of the substrate, wherein a lower surface of the conductor and a lower surface of the soft magnetic film on the convex part are approximately in the same plane;
    an electro-magnet for generating the external electro-magnetic field; and
    an electro-magnetic generation unit for flowing current through the electro-magnet to instantaneously generate the external electro-magnetic field stronger than coercive field strength of the perpendicular magnetic record medium in the electro-magnet.

12. The electro-magnetic field copying device according to claim 11, wherein
    an inductance of a coil constituting the electro-magnet is 10 mH or less.

13. The electro-magnetic field copying device according to claim 11, wherein
    the electro-magnetic field generation unit generates two or more external electro-magnetic fields, using one DC power supply.

14. The electro-magnetic field copying device according to claim 11, wherein the soft magnetic material is formed inside the concave part and the conductor is formed directly on the soft magnetic material formed in the concave part.

* * * * *